US011190435B2

(12) United States Patent
Chiba et al.

(10) Patent No.: US 11,190,435 B2
(45) Date of Patent: Nov. 30, 2021

(54) CONTROL APPARATUS, COMMUNICATION SYSTEM, TUNNEL ENDPOINT CONTROL METHOD, AND PROGRAM

(71) Applicant: NEC Corporation, Tokyo (JP)

(72) Inventors: Yasunobu Chiba, Tokyo (JP); Kazushi Sugyou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 16/591,286

(22) Filed: Oct. 2, 2019

(65) Prior Publication Data

US 2020/0145317 A1 May 7, 2020

Related U.S. Application Data

(63) Continuation of application No. 15/494,430, filed on Apr. 21, 2017, now Pat. No. 10,462,038, which is a
(Continued)

(51) Int. Cl.
  *H04L 12/46* (2006.01)
  *H04L 12/24* (2006.01)
(Continued)

(52) U.S. Cl.
  CPC .......... *H04L 45/02* (2013.01); *H04L 12/4641* (2013.01); *H04L 12/6418* (2013.01); *H04L 61/2592* (2013.01)

(58) Field of Classification Search
  CPC ............. H04L 63/0272; H04L 12/4641; H04L 63/0428; H04L 12/4633; H04L 63/101;
(Continued)

(56) References Cited

U.S. PATENT DOCUMENTS 6,859,430 B1 2/2005 Frank
7,366,894 B1 * 4/2008 Kalimuthu .......... H04L 63/0272
                                                        713/153
(Continued)

FOREIGN PATENT DOCUMENTS

JP     2011-070549 A      4/2011
WO  WO 2010/041996 A1  4/2010
WO  WO 2011/087122 A1  7/2011

OTHER PUBLICATIONS

Extended European Search Report dated Jun. 13, 2016, by the European Patent Office in counterpart European Patent Application No. 13869934.3.
(Continued)

*Primary Examiner* — Sai Aung

(57) ABSTRACT

The present invention contributes to facilitating: setting for connection between a TEP in a virtual network configured by using a virtual tunnel and a virtual network; and management of the connection. A control apparatus includes: a connection detection unit configured to detect that a virtual machine has newly been connected to one of a plurality of tunnel endpoints each of which functions as an endpoint of a virtual tunnel used for a communication between virtual machines that belong to a virtual network; a virtual network determination unit configured to determine a virtual network to which the detected virtual machine belongs on the basis of information in which virtual machines and virtual networks are associated with each other; and a tunnel endpoint control unit configured to cause, if the tunnel endpoint has not participated in the determined virtual network, the tunnel endpoint to participate in the determined virtual network.

17 Claims, 11 Drawing Sheets

Related U.S. Application Data continuation of application No. 14/758,748, filed as application No. PCT/JP2013/085147 on Dec. 27, 2013, now Pat. No. 9,667,527.

(51) Int. Cl.
*H04L 12/751* (2013.01)
*H04L 12/64* (2006.01)
*H04L 29/12* (2006.01)

(58) Field of Classification Search
CPC . H04L 63/164; H04L 12/46; H04L 29/06829; H04L 41/5054; H04L 45/00; H04L 45/586; H04L 45/64; H04L 47/825; H04L 49/354; H04L 63/00
See application file for complete search history.

(56) References Cited

U.S. PATENT DOCUMENTS

| | | | | |
|---|---|---|---|---|
| 8,910,273 | B1* | 12/2014 | Fausak | H04L 67/2823 726/15 |
| 8,958,293 | B1* | 2/2015 | Anderson | H04L 67/1002 370/230 |
| 9,154,381 | B2 | 10/2015 | Dutta | |
| 9,356,803 | B2 | 5/2016 | Schmidek | |
| 10,228,959 | B1* | 3/2019 | Anderson | G06F 9/4856 |
| 2009/0080366 | A1 | 3/2009 | Shao | |
| 2009/0249439 | A1 | 10/2009 | Litvin | |
| 2009/0259755 | A1* | 10/2009 | Boucachard | H04L 12/4633 709/227 |
| 2010/0192202 | A1* | 7/2010 | Ker | H04L 63/101 726/4 |
| 2010/0322255 | A1 | 12/2010 | Hao et al. | |
| 2011/0184993 | A1 | 7/2011 | Chawla | |
| 2012/0147890 | A1 | 6/2012 | Kikuchi | |
| 2012/0185856 | A1 | 7/2012 | Ashihara | |
| 2012/0278807 | A1 | 11/2012 | Nakagawa | |
| 2012/0311568 | A1 | 12/2012 | Jansen | |
| 2013/0132531 | A1 | 5/2013 | Koponen et al. | |
| 2013/0287036 | A1* | 10/2013 | Banavalikar | H04L 45/586 370/401 |
| 2013/0332564 | A1* | 12/2013 | Jones | G06F 16/24564 709/217 |
| 2013/0347095 | A1 | 12/2013 | Barjatiya et al. | |
| 2014/0012940 | A1 | 1/2014 | Joshi et al. | |
| 2014/0026231 | A1 | 1/2014 | Barak et al. | |
| 2014/0115578 | A1 | 4/2014 | Cooper et al. | |
| 2014/0123135 | A1 | 5/2014 | Huang et al. | |
| 2014/0223435 | A1 | 8/2014 | Chang | |

OTHER PUBLICATIONS

International Search Report (ISR) (PCT Form PCT/ISA/210), in PCT/JP2013/085147, dated Mar. 18, 2014.

M.Mahalingam, and seven others, "VXLAN: A Framework for Overlaying Virtualized Layer 2 Networks over Layer 3 Networks," [online], [searched on Nov. 29, 2012], Internet <URL: http://tools.ietf.org/pdf/draft-mahalingam-dutt-dcops-vxlan-02.pdf>.

M.Sridharan, and eight others, "NVGRE: Network Virtualization using Generic Routing Encapsulation," [online], [Nov. 29, 2012], Internet <URL: http://tools.ietf.org/pdf/draft-sridharan-virtualization-nvgre-01.pdf>.

Nick McKeown, and seven others, "OpenFlow: Enabling Innovation in Campus Networks," [online], [searched on Nov. 22, 2012], Internet <URL: http://www.openflow.org/documents/openflow-wp-latest.pdf>.

"OpenFlow Switch Specification" Version 1.1.0 Implemented (Wire Protocol 0x02), [online], [searched on Nov. 22, 2012], Internet <URL:http://www.openflow.org/documents/openflow-spec-v1.1.0.pdf>.

Nao Tamura, Datacenter no Network o Kaeru Shin Gijutsu 'Ethernet Fabric', Nikkei NETWORK, No. 146, Jun. 2012, pp. 59-63.

Yukio Nagabuchi et al., "Proposal for Distributed Autonomous System in Cloud Network", The Institute of Electronics Information and Communication Engineers (IEICE) Technical Report, Mar. 8-9, 2012, pp. 229-234.

Hiroshi Asakura et al., "Distributed Traffic Log Management System", Proceedings of the 2011 IEICE (the Institute of Electronics, Information and Communication Engineers) Society Conference, Sep. 13-16, 2011, p. 97.

Notice of Reasons for Refusal, dated May 8, 2018, issued in counterpart Japanese Patent Application No. 2014-555458.

* cited by examiner

FIG. 4

| VM IDENTIFIER | TEP ID |
|---|---|
| VM1 | TEP-1 |
| VM2 | TEP-1 |
| VM3 | TEP-2 |
| VM4 | TEP-2 |
| VM5 | TEP-3 |
| VM6 | TEP-3 |
| ⋮ | ⋮ |

FIG. 5

| VM IDENTIFIER | VIRTUAL NETWORK IDENTIFIER |
|---|---|
| VM1 | VIRTUAL NW #1 |
| VM2 | VIRTUAL NW #3 |
| VM3 | VIRTUAL NW #2 |
| VM4 | VIRTUAL NW #1 |
| VM5 | VIRTUAL NW #1 |
| VM6 | VIRTUAL NW #3 |
| VM7 | VIRTUAL NW #3 |
| ⋮ | |

FIG. 6

| VIRTUAL NETWORK IDENTIFIER | TEP ID |
|---|---|
| VIRTUAL NW #1 | TEP-1 |
| VIRTUAL NW #1 | TEP-2 |
| VIRTUAL NW #1 | TEP-3 |
| VIRTUAL NW #3 | TEP-1 |
| VIRTUAL NW #3 | TEP-3 |
| ⋮ | ⋮ |

FIG. 8

| VM IDENTIFIER | TEP ID |
|---|---|
| VM1 | TEP-1 |
| VM2 | TEP-1 |
| VM3 | TEP-2 |
| VM4 | TEP-2 |
| VM5 | TEP-3 |
| VM6 | TEP-3 |
| VM7 | TEP-2 |
| ⋮ | ⋮ |

FIG. 11

| VIRTUAL NETWORK IDENTIFIER | TEP ID |
|---|---|
| VIRTUAL NW #1 | TEP-1 |
| VIRTUAL NW #1 | TEP-2 |
| VIRTUAL NW #1 | TEP-3 |
| VIRTUAL NW #2 | TEP-2 |
| VIRTUAL NW #3 | TEP-2 |
| VIRTUAL NW #3 | TEP-3 |
| ⋮ | ⋮ |

CONTROL APPARATUS, COMMUNICATION SYSTEM, TUNNEL ENDPOINT CONTROL METHOD, AND PROGRAM

CROSS-REFERENCE TO RELATED PATENT APPLICATIONS

This application is a continuation of U.S. patent application Ser. No. 15/494,430, filed Apr. 21, 2017 (now U.S. Pat. No. 10,462,038), which is a continuation of U.S. patent application Ser. No. 14/758,748, filed Jun. 30, 2015 (now U.S. Pat. No. 9,667,527), which is a National Stage Entry of International Application No. PCT/JP2013/085147, filed Dec. 27, 2013, which claims priority from Japanese Patent Application No. 2013-000160, filed Jan. 4, 2013. The entire contents of the above-referenced applications are expressly incorporated herein by reference.

REFERENCE TO RELATED APPLICATION

This application is a continuation of U.S. application Ser. No. 15/494,430, filed Apr. 21, 2017, which is a continuation of U.S. patent application Ser. No. 14/758,748, filed Jun. 30, 2015 (U.S. Pat. No. 9,667,527), which is a National Stage Entry of International Application No. PCT/JP2013/085147, filed Dec. 27, 2013, which is based upon and claims the benefit of priority of Japanese patent application No. 2013-000160, filed on Jan. 4, 2013, the disclosure of which is incorporated herein in its entirety by reference thereto. The present invention relates to a control apparatus, a communication system, a tunnel endpoint control method, and a program. In particular, it relates to: a control apparatus which controls a communication between virtual machines that belong to a virtual network configured by using a virtual tunnel; a communication system; a tunnel endpoint control method; and a program.

TECHNICAL FIELD

Background

In recent years, techniques referred to as a VXLAN (Virtual Extensible Local Area Network), NVGRE (Network Virtualization using Generic Routing Encapsulation), and SIT (Stateless Transport Tunneling) have been proposed as tunneling protocols that could be applied to cloud computing. NPL 1 is a draft of the VXLAN.

In the VXLAN, a layer 2 frame is encapsulated at a tunnel endpoint that functions as an endpoint of a virtual tunnel. In this encapsulation, a VXLAN Network Identifier (VNI) having a length of 24 bits is added to an encapsulation header (outer header) (see "5. VXLAN Frame Format" on Page 9 and the subsequent description thereof in NPL 1). The length of the VNI is twice the length of a VLAN ID defined by IEEE802.1Q. Thus, since the number of "tenants (users sharing a physical network)" in the above cloud computing environment can significantly be increased (up to about 16.77 million (2"24)), the VXLAN has been drawing attention. In addition, NPL 2 is a draft of the NVGRE in which the same tunneling as that of the VXLAN is performed. In the NVGRE, the number of segments obtained through logical division can also be increased by using a Tenant Network Identifier (TNI) having a length of 24 bits.

In addition, a technique referred to as OpenFlow has been proposed (see NPLs 3 and 4). OpenFlow recognizes communications as end-to-end flows and performs path control, failure recovery, load balancing, and optimization on a per-flow basis. Each OpenFlow switch according to NPL 4 has a secure channel for communication with an OpenFlow controller and operates according to a flow table suitably added or rewritten by the OpenFlow controller. In the flow table, a set of the following three is defined for each flow: Match conditions (Match Fields) against which a packet header is matched; Flow statistical information (Counters); and Instructions that define at least one processing content (see section "4.1 Flow Table" in NPL 4).

For example, when an OpenFlow switch receives a packet, the OpenFlow switch searches the flow table for an entry having a match condition that matches header information of the received packet (see 4.3 "Match Fields" in NPL 4). If, as a result of the search, the OpenFlow switch finds an entry that matches the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry that matches the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry in which at least one processing content is defined from the OpenFlow controller and updates the flow table. In this way, by using an entry stored in the flow table as a processing rule, the OpenFlow switch performs packet forwarding.

NON-PATENT LITERATURE (NPL)

NPL 1: M. Mahalingam, and seven others, "VXLAN: A Framework for Overlaying Virtualized Layer 2 Networks over Layer 3 Network," [online], [searched on Nov. 29, 2012], Internet <URL:http://tools.ietf.org/pdf/draft-mahalingam-dutt-dcops-vxlan-02.pdf>

NPL 2: M. Sridharan, and eight others, "NVGRE: Network Virtualization using Generic Routing Encapsulation," [online], [Nov. 29, 2012], Internet <URL:http://tools.ietf.org/pdf/draft-sridharan-virtualization-nvgre-01.pdf>

NPL 3: Nick McKeown, and seven others, "OpenFlow: Enabling Innovation in Campus Networks," [online], [searched on Nov. 22, 2012], Internet <URL:http://www.openflow.org/documents/openflow-wp-latest.pdf>

NPL 4: "Open Flow Switch Specification" Version 1.1.0 Implemented (Wire Protocol 0x02), [online], [searched on Nov. 22, 2012], Internet <URL:http://www.openflow.org/documents/openflow-spec-v1.1.0.pdf>

SUMMARY

The following analysis has been made by the present inventor. According to a virtual tunnel technique compatible, for example, with the VXLAN or NVGRE in NPL 1 or 2, one virtual machine communicates with another virtual machine that belongs to the same virtual network connected to an opposite tunnel endpoint (which will simply be referred to as a "TEP") that functions as an endpoint of a virtual tunnel via a TEP to which the one virtual machine has been connected. To realize such communication, it is necessary to perform setting for causing the TEP to which the one virtual machine has been connected to participate in the virtual network with which the virtual machine is associated (more specifically, setting for causing the TEP to participate in a multicast group having a corresponding VNI).

In a virtual environment, depending on a service demand, a virtual machine is established or moved (migrated) to another virtual server. Thus, when virtual machines communicate with each other via a virtual tunnel compatible with the VXLAN or NVGRE in NPL 1 or 2, there is a problem that the setting for causing a TEP to participate in (connect to) a virtual network and the management of the set information become complex.

An object of the present invention is to provide a control apparatus, a communication system, a tunnel endpoint control method, and a program that can contribute to facilitating: setting for connection between a TEP in a virtual network configured by using a virtual tunnel and a virtual network; and management of the connection.

According to a first aspect, there is provided a control apparatus, including: a connection detection unit configured to detect that a virtual machine has newly been connected to one of a plurality of tunnel endpoints each of which functions as an endpoint of a virtual tunnel used for a communication between virtual machines that belong to a virtual network; a virtual network determination unit configured to determine a virtual network to which the detected virtual machine belongs on the basis of information in which virtual machines and virtual networks are associated with each other; and a tunnel endpoint control unit configured to cause, if the tunnel endpoint has not participated in the determined virtual network, the tunnel endpoint to participate in the determined virtual network.

According to a second aspect, there is provided a communication system, including: a control apparatus; and a plurality of tunnel endpoints controlled by the control apparatus; wherein the control apparatus includes: a connection detection unit configured to detect that a virtual machine has newly been connected to one of a plurality of tunnel endpoints each of which functions as an endpoint of a virtual tunnel used for a communication between virtual machines that belong to a virtual network; a virtual network determination unit configured to determine a virtual network to which the detected virtual machine belongs on the basis of information in which virtual machines and virtual networks are associated with each other; and a tunnel endpoint control unit configured to cause, if the tunnel endpoint has not participated in the determined virtual network, the tunnel endpoint to participate in the determined virtual network.

According to a third aspect, there is provided a tunnel endpoint control method, including: causing a control apparatus, which controls a plurality of tunnel endpoints each of which functions as an endpoint of a virtual tunnel used for a communication between virtual machines that belong to a virtual network, to detect that a virtual machine has newly been connected to one of the plurality of tunnel endpoints; causing the control apparatus to determine a virtual network to which the detected virtual machine belongs on the basis of information in which virtual machines and virtual networks are associated with each other; and causing the control apparatus to cause, if the tunnel endpoint has not participated in the determined virtual network, the tunnel endpoint to participate in the determined virtual network. This method is associated with a certain machine, namely, with the control apparatus that controls the tunnel endpoints.

According to a fourth aspect of the present invention, there is provided a program, causing a computer, which controls a plurality of tunnel endpoints each of which functions as an endpoint of a virtual tunnel used for a communication between virtual machines that belong to a virtual network, to perform processing for: detecting that a virtual machine has newly been connected to one of the plurality of tunnel endpoints; determining a virtual network to which the detected virtual machine belongs on the basis of information in which virtual machines and virtual networks are associated with each other; and causing, if the tunnel endpoint has not participated in the determined virtual network, the tunnel endpoint to participate in the determined virtual network. This program can be recorded in a computer-readable (non-transient) storage medium. Namely, the present invention can be embodied as a computer program product.

The meritorious effects of the present invention are summarized as follows.

The present invention can contribute to facilitating: setting for connection between a TEP in a virtual network configured by using a virtual tunnel and a virtual network; and management of the connection.

BRIEF DESCRIPTION OF DRAWINGS

FIG. 4 illustrates exemplary information stored in a VM-TEP connection status storage unit in the control apparatus according to the first exemplary embodiment of the present disclosure.

FIG. 5 illustrates exemplary information stored in a VM-virtual NW relationship storage unit in the control apparatus according to the first exemplary embodiment of the present disclosure.

FIG. 6 illustrates exemplary information stored in a virtual NW-TEP connection status storage unit in the control apparatus according to the first exemplary embodiment of the present disclosure.

FIG. 8 illustrates an entry added to the VM-TEP connection status storage unit in response to the connection of the VM7.

FIG. 11 illustrates an entry added to the virtual NW-TEP connection status storage unit in response to the connection of the TEP-2.

PREFERRED MODES

Figure 1:
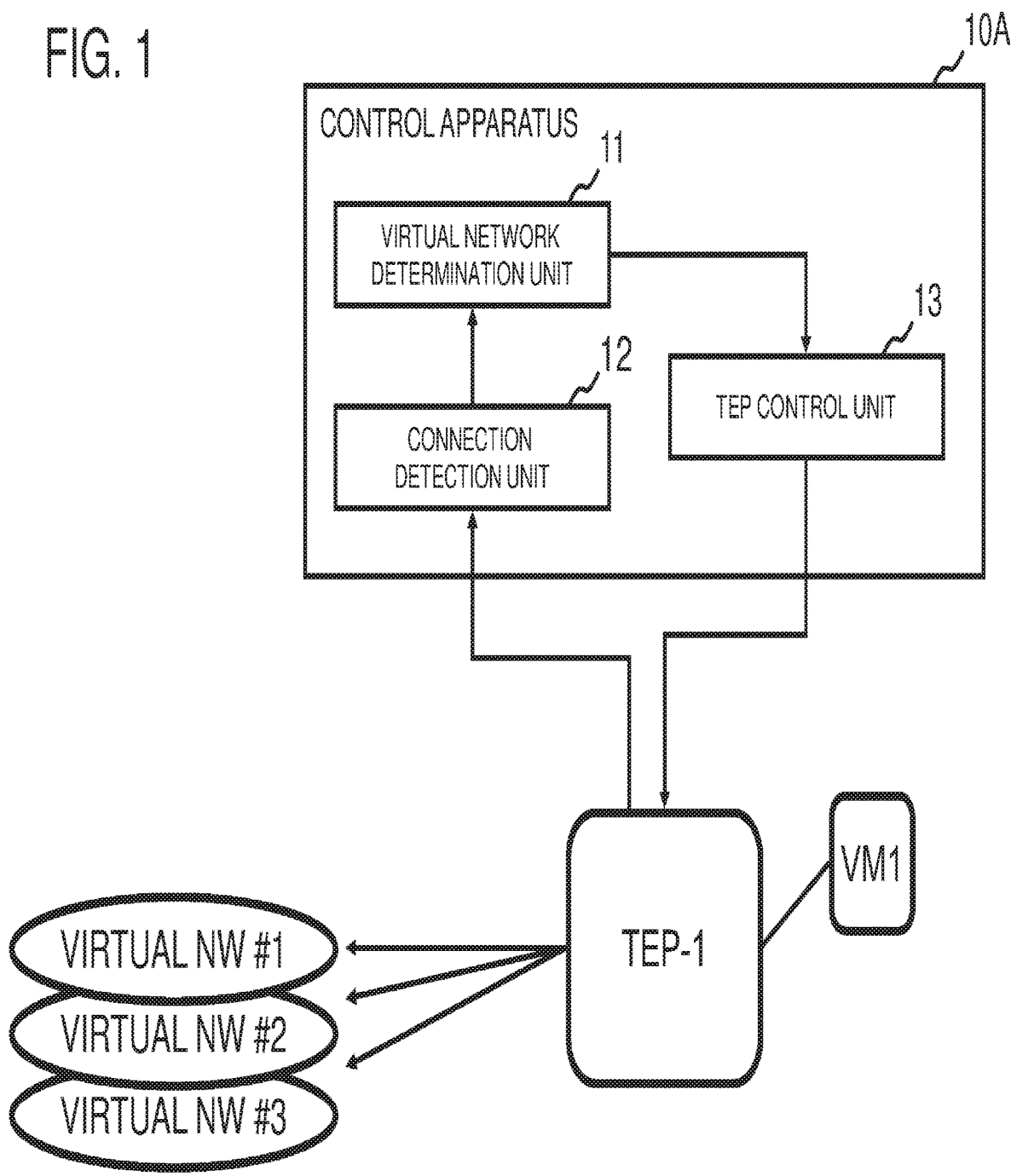
FIG. 1 illustrates a configuration according to an exemplary embodiment the present disclosure.

First, an outline of an exemplary embodiment of the present disclosure will be described with reference to a drawing. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a control apparatus 10A including a virtual network determination unit 11, a connection detection unit 12, and a TEP (tunnel endpoint) control unit 13.

More specifically, the connection detection unit 12 detects that a virtual machine (for example, VM1 in FIG. 1) has newly been connected to a tunnel endpoint (for example, TEP-1 in FIG. 1) which functions as an endpoint of a virtual tunnel used for a communication between virtual machines that belong to a virtual network. By receiving a notification of connection of a VM to a TEP from the TEP, the connection detection unit 12 can detect that the VM has newly been connected to the TEP. Alternatively, the connection detection unit 12 may receive such notification from a virtual network management system or the like that provides a management environment for virtual machines or virtual switches. Alternatively, another method may be used.

Next, the virtual network determination unit 11 determines a virtual network to which the detected virtual machine (for example, the VM1 in FIG. 1) belongs on the basis of information in which virtual machines and virtual networks are associated with each other. The virtual network may be determined by using a table or the like equivalent to a table for managing a relationship between VNIs and MAC addresses of virtual machines held in tunnel endpoints. Alternatively, when transmitting a virtual machine detection notification, each tunnel endpoint may add a VNI in the virtual machine detection notification.

If the tunnel endpoint (for example, the TEP-1 in FIG. 1) to which the virtual machine (for example, the VM1 in FIG. 1) has newly been connected has not participated in the determined virtual network, the TEP control unit 13 causes the tunnel endpoint to participate in the determined virtual network. More specifically, the TEP control unit 13 performs processing for instructing the tunnel endpoint to participate (JOIN) in a multicast group configured by the determined virtual network.

In this way, when a virtual machine is connected to a tunnel endpoint, setting of the tunnel endpoint is automatically performed.

First Exemplary Embodiment

Figure 2:
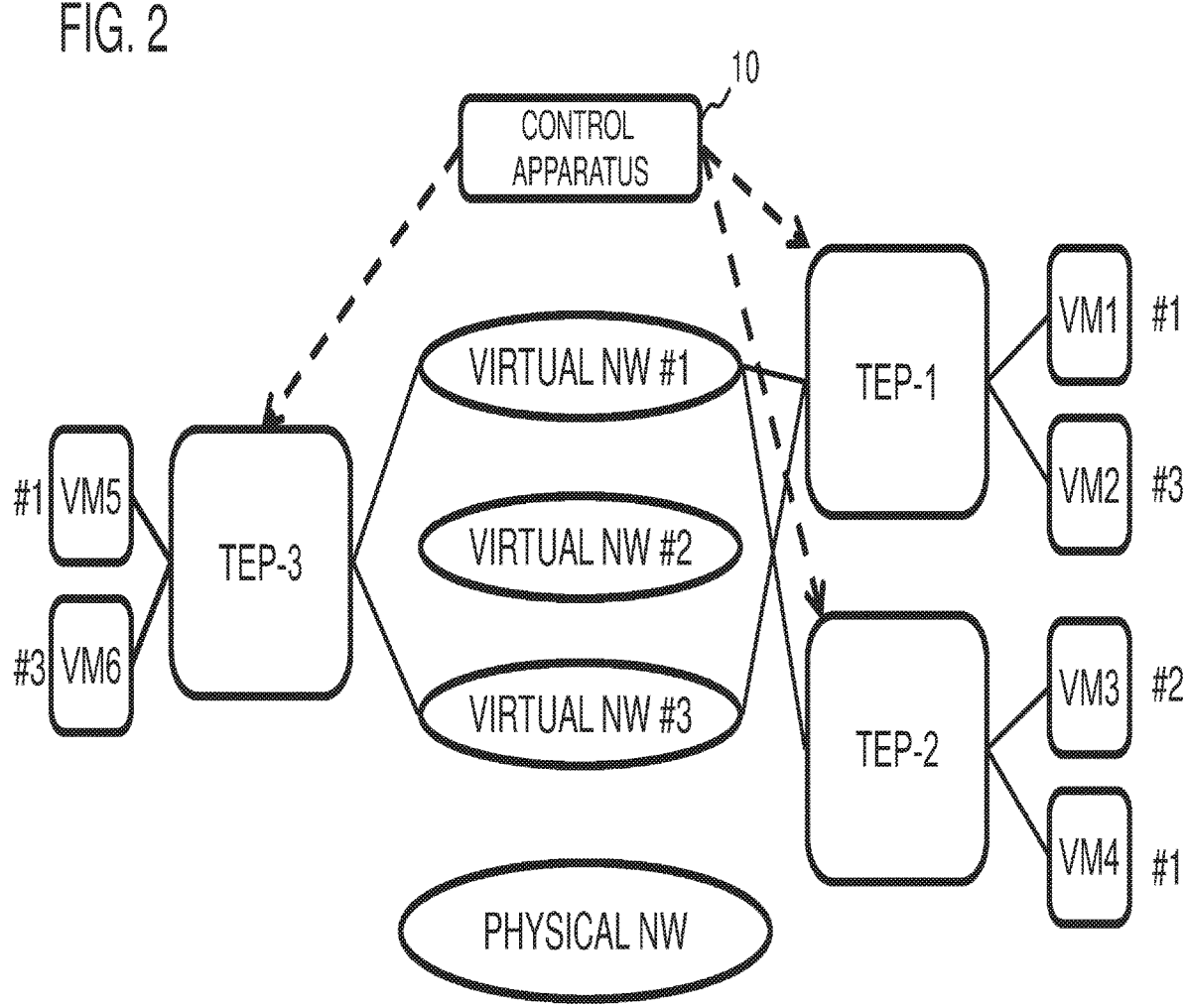
FIG. 2 illustrates a configuration of a communication system according to a first exemplary embodiment of the present disclosure.

Next, a first exemplary embodiment of the present disclosure will be described in detail with reference to the drawings. FIG. 2 illustrates a configuration of a communication system according to the first exemplary embodiment of the present disclosure. FIG. 2 illustrates: a physical network (a physical NW); virtual networks (virtual NWs #1 to #3) which are obtained through logical division of the physical NW; tunnel endpoints TEP-1 to TEP-3 each of which configures at least one virtual tunnel through at least one of the virtual NWs #1 to #3; virtual machines (VMS) 1 to 6 each of which can be connected to at least one of the tunnel endpoints TEP-1 to TEP-3; and a control apparatus 10 which controls the tunnel endpoints TEP-1 to TEP-3.

Each of the virtual NWs #1 to #3 is a network obtained through logical division by using the VXLAN NPL 1, the NVG RE in NPL 2, STT, or an equivalent technique in which, by using a tunnel endpoint, even if a VM does not know its own virtual network identifier or the like, the VM can communicate with a VM connected to the same tunnel endpoint or another tunnel endpoint.

The tunnel endpoints TEP-1 to TEP-3 are configured by physical switches, virtual switches, or the like controlled by the control apparatus 10. Any one of the tunnel endpoints TEP-1 to TEP-3 can configure a virtual tunnel with an opposite tunnel endpoint via a virtual NW. As the tunneling protocol, the VXLAN protocol in NPL 1, the NVGRE protocol in NPL 2, the STT protocol, or an equivalent protocol may be used.

Each of the VMs 1 to 6 is managed by a hypervisor or the like (not illustrated) and operates on a virtual server or the like. If physical switches are used as the tunnel endpoints TEP-1 to TEP-3, the VMs 1 to 6 are connected to the tunnel endpoints TEP-1 to TEP-3 via virtual switches arranged on the virtual server. Each of the VMs 1 to 6 in FIG. 2 is given one of the numbers #1 to #3 and belongs to a virtual network indicated by a corresponding one of the numbers #1 to #3.

Figure 3:
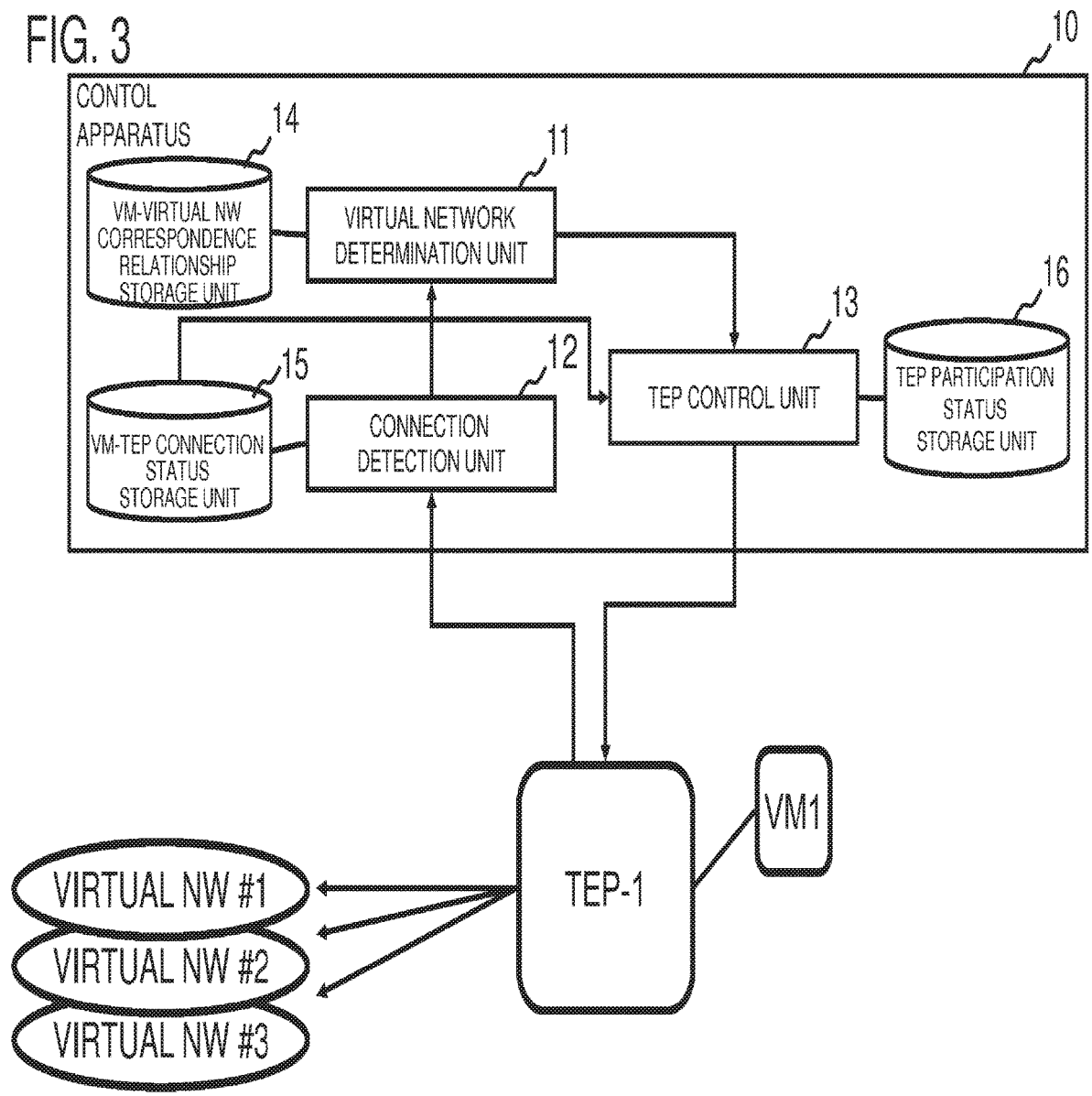
FIG. 3 is a functional block diagram illustrating a detailed configuration of a control apparatus according to the first exemplary embodiment of the present disclosure.

FIG. 3 is a functional block diagram illustrating a detailed configuration of the control apparatus according to the first exemplary embodiment of the present disclosure. As illustrated in FIG. 3, the control apparatus includes a virtual network determination unit 11, a connection detection unit 12, a TEP control unit 13, a VM-virtual NW correspondence relationship storage unit (second storage unit) 14, a VM-TEP connection status storage unit (first storage unit) 15, and a TEP participation status storage unit (third storage unit) 16.

FIG. 4 illustrates exemplary information stored in the VM-TEP connection status storage unit 15 in the control apparatus according to the present exemplary embodiment. In the example in FIG. 4, as illustrated in FIG. 2, entries indicating that the VMs 1 and 2 are connected to the tunnel endpoint TEP-1 are stored. Likewise, entries indicating that the VMs 3 and 4 are connected to the tunnel endpoint TEP-2 and the VMs 5 and 6 are connected to the tunnel endpoint TEP-3 are stored.

When detecting that a VM has newly been connected to a TEP, the connection detection unit 12 adds a corresponding entry in the VM-TEP connection status storage unit 15 and notifies the virtual network determination unit 11 of the connection. When detecting that a VM has been removed or moved from a TEP, the connection detection unit 12 deletes a corresponding entry from the VM-TEP connection status storage unit 15 and notifies the virtual network determination unit 11 of the removal or movement.

For example, the control apparatus 10 may detect connection of a VM to a TEP by receiving a notification from the TEP or from a virtual network management system providing a management environment for virtual machines or virtual switches. Alternatively, the control apparatus 10 may be notified by the administrator of the VM or a servicer. Alternatively, the control apparatus 10 may analyze a packet transmitted from the VM and determine connection of the VM on the basis of a feature or an identifier of the packet.

The control apparatus 10 may detect connection of a VM to a TEP by causing the connection detection unit 12 receive a notification from another apparatus managing the virtual machines (for example, a virtual machine management apparatus, a control apparatus, or a higher-level apparatus that manages a virtual machine management apparatus). Each virtual machine may be provided with a function of notifying, when connected to a TEP, the control apparatus 10 of the connection to the TEP.

In addition, if a TEP is configured by an OpenFlow switch in NPLs 3 and 4, control information (a flow entry) for causing the TEP to forward a packet transmitted from a VM to the control apparatus 10 may be set. For example, control information (a flow entry) for causing a TEP to output, when the TEP receives a packet from a VM, the packet via a port connected to the control apparatus 10 may be set. Alternatively, an OpenFlow switch may transmit a Packet-In message for requesting the OpenFlow controller to transmit control information (a flow entry).

FIG. 5 illustrates exemplary information stored in the VM-virtual NW correspondence relationship storage unit 14 in the control apparatus according to the present exemplary embodiment. In the example in FIG. 5, as illustrated in FIG. 2, entries indicating a correspondence relationship among the virtual machines and the virtual networks are stored. More specifically, the entries indicate that the VMs 1, 4, and 5 belong to the virtual network #1, the VMs 2, 6, and 7 belong to the virtual network #3, and the VM3 belongs to the virtual network #2. As the VM-virtual NW correspondence relationship illustrated in FIG. 5, the control apparatus may acquire, from each TEP, mapping information indicating a correspondence between MAC addresses of VMs stored by a TEP for determining forwarding destinations of received packets and VNIs (TNIs) (see "4.1. Unicast VM to VM communication" in NPL 1).

When notified by the connection detection unit 12 of connection of a new VM, the virtual network determination unit 11 refers to the VM-virtual NW correspondence relationship storage unit 14, determines a virtual network to which the new VM needs to belong, and notifies the TEP control unit 13 of the determined virtual network. When notified by the connection detection unit 12 of removal of a VM, the virtual network determination unit 11 refers to the VM-virtual NW correspondence relationship storage unit 14, determines a virtual network to which the new VM needs to belong, and notifies the TEP control unit 13 of the virtual network.

When notified by the virtual network determination unit 11 of the connection or removal of the VM and the determined virtual network, the TEP control unit 13 refers to the TEP participation status storage unit 16, determines whether the TEP needs to participate in the virtual network, and controls the TEP on the basis of the determination result. For example, when notified of connection of a new VM, the TEP control unit 13 refers to a connection status between virtual networks and TEPs as illustrated in FIG. 6. If the TEP to which the newly detected VM has been connected has not participated in the corresponding virtual network, the TEP control unit 13 performs processing for causing the TEP to which the newly detected VM has been connected to participate (JOIN) in a corresponding virtual network multicast group. For example, if the virtual machine connected to the determined virtual network via the tunnel endpoint has been removed, the TEP control unit 13 performs processing for causing the TEP from which the VM has been removed to withdraw (LEAVE) from the corresponding virtual network multicast group. The TEP control unit 13 updates the TEP participation status storage unit 16 on the basis of participation or withdrawal of the TEP in or from the virtual network.

For example, in the case of the VXLAN, the participation in or withdrawal from the multicast group is performed by transmitting an IGMP (Internet Group Management Protocol) message (JOIN/LEAVE) to a router or the like that manages the multicast group (see "4.2 Broadcast Communication and Mapping to Multicast" in NPL 1). Of course, another multicast group management protocol may be used.

In the configuration in FIG. 3, the VM-virtual NW correspondence relationship storage unit 14, the VM-TEP connection status storage unit 15, and the TEP participation status storage unit 16 are separately configured for illustrative purposes. Alternatively, a database or the like in which these units are integrated may be arranged. In addition, the virtual network determination unit 11, the connection detection unit 12, and the TEP control unit 13 may be integrated as needed.

Next, an operation according to the present exemplary embodiment will be described with reference to the drawings. The following description will be made on the basis of an example in which a UM has newly been connected to a TEP in FIG. 2.

Figure 7:
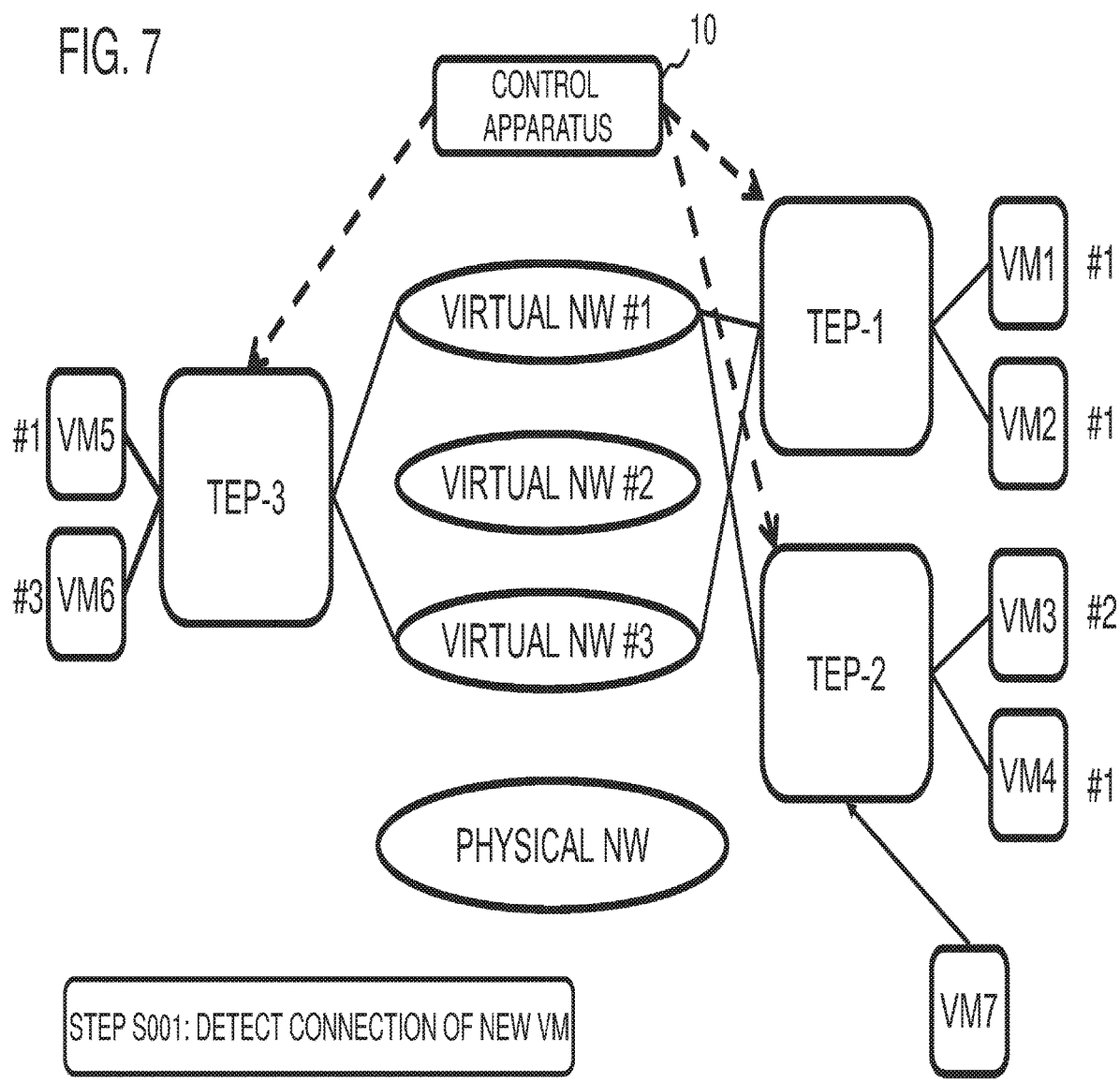
FIG. 7 illustrates a state in which a new VM7 has been connected to a TEP-2 in FIG. 2.

FIG. 7 illustrates a state in which a VM7 has been established in the communication system in FIG. 2 and connected to the TEP-2. When detecting connection of the VM7 to the TEP-2, the connection detection unit 12 in the control apparatus 10 adds an entry in which the VM7 and the TEP-2 are associated with each other in the VM-TEP connection status storage unit 15 as illustrated in FIG. 8 and notifies the virtual network determination unit 11 of the connection (step S001).

Figure 9:
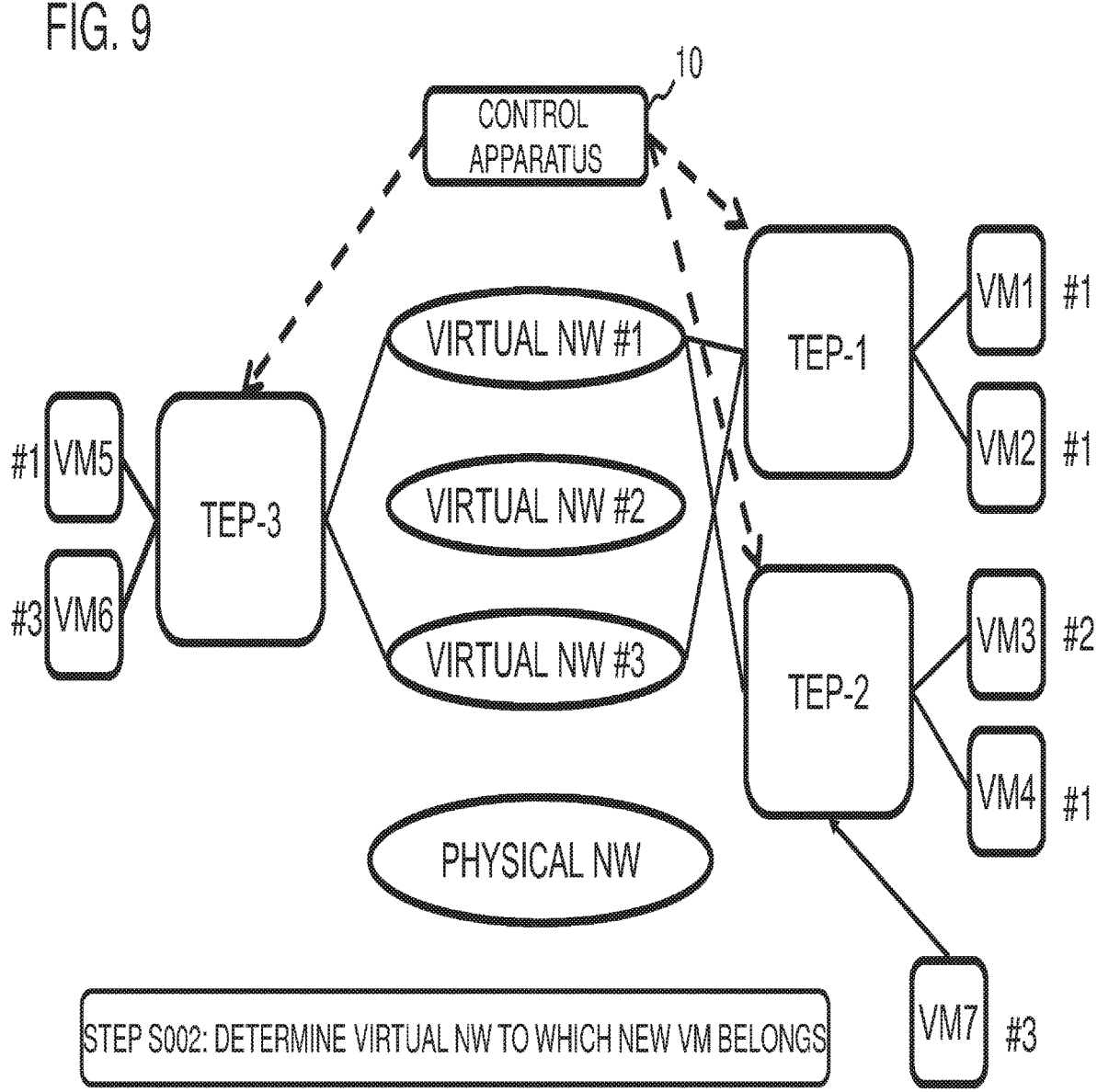
FIG. 9 illustrates a state in which the control apparatus has determined a virtual network to which the new VM7 belongs.

Next, the virtual network determination unit 11 refers to the VM-virtual NW correspondence relationship storage unit 14 and determines a virtual network to which the VM7 connected to the TEP-2 belongs. In the example in FIG. 5, since the VM7 is associated with the virtual network #3, the virtual network determination unit 11 determines that the virtual network #3 is the virtual network to which the VM7 belongs, as illustrated in FIG. 9 (step S002). The virtual network determination unit 11 notifies the TEP control unit 13 that the VM7 that belongs to the virtual network #3 has been connected to the TEP-2.

Figure 10:
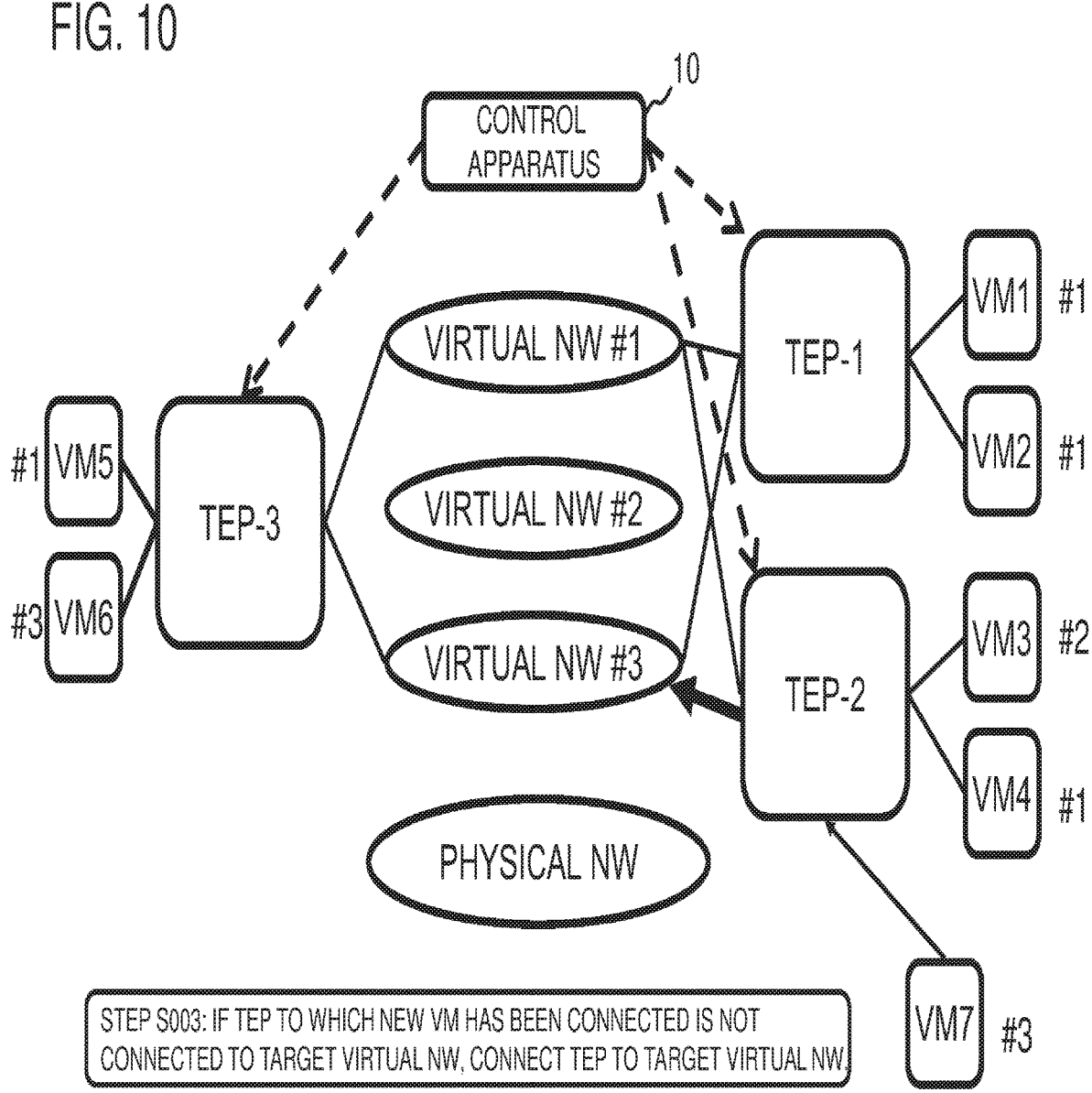
FIG. 10 illustrates a state in which the control apparatus has connected the TEP to the virtual network to which the new VM7 belongs.

When notified of the connection, the TEP control unit 13 refers to the TEP participation status storage unit 16 and determines whether the TEP-2 has already participated in the virtual network #3. As a result of the determination, if the TEP-2 has not participated in the virtual network #3, the TEP control unit 13 causes the TEP-2 to participate in the virtual network #3, as illustrated in FIG. 10 (step S003). In addition, the TEP control unit 13 adds an entry in which the TEP-2 and the virtual network #3 are associated with each other in the TEP participation status storage unit 16, as illustrated in FIG. 11.

Next, for example, if the VM7 withdraws from the TEP-2, the connection detection unit 12 in the control apparatus 10 detects the withdrawal of the VM7 from the TEP-2, deletes the entry in which the VM7 and the TEP-2 are associated with each other from the VM-TEP connection status storage unit 15 as illustrated in FIG. 4, and notifies the virtual network determination unit 11 of the withdrawal.

Next, the virtual network determination unit 11 refers to the VM-virtual NW correspondence relationship storage unit 14 and determines a virtual network to which the VM7 that has withdrawn from the TEP-2 belongs. In the example in FIG. 5, since the VM7 is associated with the virtual network #3, the virtual network determination unit 11 notifies the TEP control unit 13 that the VM7 that belongs to the virtual network #3 has withdrawn from the TEP-2.

When notified of the withdrawal, the TEP control unit 13 refers to the VM-TEP connection status storage unit 15 and the TEP participation status storage unit 16 and determines whether there is any VM connected to the virtual network #3 via the TEP-2 after the withdrawal of the VM7. If, as a result of the determination, there is no VM connected to the virtual network #3 via the TEP-2, the TEP control unit 13 causes the TEP-2 to withdraw from the virtual network #3. In addition, the TEP control unit 13 deletes the entry in which the TEP-2 and the virtual network #3 are associated with each other from the TEP participation status storage unit 16, as illustrated in FIG. 6.

In this way, in conjunction with connection/removal of a VM to/from a TEP, participation/withdrawal of the TEP in/from a virtual network is performed. Consequently, since the setting for connecting the TEP and the virtual network and complex management are no longer required, the burden on the network administrator is reduced.

While exemplary embodiments of the present invention have thus been described, the present invention is not limited thereto. Further variations, substitutions, or adjustments can be made without departing from the basic technical concept of the present invention. For example, the present invention is not limited to the configurations of the networks and the number of elements illustrated in the exemplary embodiments.

Finally, suitable modes of the present invention will be summarized.

[Mode 1]
(See the Control Apparatus According to the Above First Aspect) [Mode 2]
The control apparatus according to mode 1;
wherein, if the connection detection unit detects that the virtual machine has been removed from the tunnel endpoint, the connection detection unit notifies the virtual network determination unit of the removal of the virtual machine from the tunnel endpoint;
wherein the virtual network determination unit determines, on the basis of the information in which virtual machines and virtual networks are associated with each other, a virtual network to which the removed virtual machine has belonged and notifies the tunnel endpoint control unit of the virtual network to which the removed virtual machine has belonged and the tunnel endpoint to which the virtual machine has been connected; and
wherein, if the tunnel endpoint control unit determines that no virtual machine is connected to the determined virtual network via the tunnel endpoint after the removal of the virtual machine, the tunnel endpoint control unit causes the tunnel endpoint to withdraw from the determined virtual network.

[Mode 3]
The control apparatus according to mode 1 or 2, further comprising:
a first storage unit configured to store virtual machines connected to the tunnel endpoints;
a second storage unit configured to store the correspondence relationship between virtual machines and virtual networks; and
a third storage unit configured to store a virtual network(s) in which each of the tunnel endpoints participates;
wherein the control apparatus determines whether the tunnel endpoint to which the virtual machine has newly been connected has participated in the determined virtual network by referring to the third storage unit.

[Mode 4]
The control apparatus according to any one of modes 1 to 3;
wherein the connection detection unit detects that the virtual machine has been connected to the tunnel endpoint by receiving a notification from a virtual server on which the newly connected virtual machine operates.

[Mode 5]
The control apparatus according to any one of modes 1 to 3;
wherein the control apparatus detects that the virtual machine has been connected to the tunnel endpoint by setting control information for notifying the control apparatus of the connection of the virtual machine on the basis of a packet from the virtual machine in a switch that configures the tunnel endpoint.

[Mode 6]
(See the Communication System According to the Above Second Aspect)
[Mode 7]
(See the Tunnel Endpoint Control Method According to the Above Third Aspect)
[Mode 8]
(See the Program According to the Above Fourth Aspect)

Modes 6 to 8 can be expanded in the same way as mode 1 is expanded to modes 2 to 5.

The disclosure of each of the above NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 10, 10A control apparatus
11 virtual network determination unit
12 connection detection unit
13 TEP control unit
14 VM--virtual NW correspondence relationship storage unit (second storage unit)
15 VM-TEP connection status storage unit (first storage unit)
16 TEP participation status storage unit (third storage unit)
TEP-1 to TEP-3 tunnel endpoint
VM1 to VM6 virtual machine

The invention claimed is:
1. A communication system, comprising:
a first tunnel endpoint configured to terminate a virtual tunnel;
a control apparatus configured to control the first tunnel endpoint; and
a first virtual machine belonging to a virtual network;
wherein the control apparatus comprises:
a memory storing instructions; and
a processor configured to execute the instructions to:
detect a change of connection between the first virtual machine and the first tunnel endpoint;
update a correspondence between the first tunnel endpoint and the virtual network, in response to the change of the connection;
detect removal of the first virtual machine from the first tunnel endpoint; and
update the correspondence between the first tunnel endpoint and the virtual network to indicate that the first tunnel endpoint does not belong to the virtual network.
2. The communication system according to claim 1, wherein the processor is further configured to execute the instructions to:

update the correspondence in response to a notification from a virtual server on which the connected first virtual machine operates.

3. The communication system according to claim 1, wherein the processor is further configured to execute the instructions to:
detect that the first virtual machine has been connected to the first tunnel endpoint by setting control information for notifying the control apparatus of the connection of the first virtual machine based on a packet from the first virtual machine in a switch that configures the first tunnel endpoint.

4. The communication system according to claim 1, wherein the processor is further configured to execute the instructions to:
detect that the first virtual machine has been connected to the first tunnel endpoint by analyzing a packet transmitted from the first virtual machine; and
determine the connection of the first virtual machine.

5. The communication system according to claim 1, wherein the processor is further configured to execute the instructions to:
detect the connection between the first virtual machine and the first tunnel endpoint;
update the correspondence between the first tunnel endpoint and virtual network to indicate that the first tunnel endpoint belongs to the virtual network.

6. The communication system according to claim 1, further comprising:
a plurality of virtual machine; and
a plurality of tunnel endpoint;
wherein the processor is further configured to execute the instructions to:
detect a change of connection between one of the plurality of virtual machine and one of the plurality of tunnel endpoint; and
update the correspondence between the virtual network and the one of the plurality of tunnel endpoint, in response to the change of the connection.

7. A control apparatus, controlling a first tunnel endpoint comprising:
a memory storing instructions; and
a processor configured to execute the instructions to:
detect a change of connection between a first virtual machine belonging to a virtual network and the first tunnel endpoint configured to terminate a virtual tunnel;
update a correspondence between the first tunnel endpoint and the virtual network, in response to the change of the connection;
detect removal of the first virtual machine from the first tunnel endpoint; and
update the correspondence between the first tunnel endpoint and the virtual network to indicate that the first tunnel endpoint does not belong to the virtual network.

8. The control apparatus according to claim 7, wherein the processor is further configured to execute the instructions to:
update the correspondence in response to a notification from a virtual server on which the connected first virtual machine operates.

9. The control apparatus according to claim 7, wherein the processor is further configured to execute the instructions to:
detect that the first virtual machine has been connected to the first tunnel endpoint by setting control information for notifying the control apparatus of the connection of the first virtual machine based on a packet from the first virtual machine in a switch that configures the first tunnel endpoint.

10. The control apparatus according to claim 7, wherein the processor is further configured to execute the instructions to:
detect that the first virtual machine has been connected to the first tunnel endpoint by analyzing a packet transmitted from the first virtual machine; and
determine the connection of the first virtual machine.

11. The control apparatus according to claim 7, wherein the processor is further configured to execute the instructions to:
detect the connection between the first virtual machine and the first tunnel endpoint;
update a correspondence between the first tunnel endpoint and virtual network to indicate that the first tunnel endpoint belongs to the virtual network.

12. A method for controlling a first tunnel endpoint comprising a step of:
detecting a change of connection between a first virtual machine belonging to a virtual network and the first tunnel endpoint configured to terminate a virtual tunnel;
updating a correspondence between the first tunnel endpoint and the virtual network, in response to the change of the connection;
detecting removal of the first virtual machine from the first tunnel endpoint; and
updating the correspondence between the first tunnel endpoint and the virtual network to indicate that the first tunnel endpoint does not belong to the virtual network.

13. The method according to claim 12,
updating the correspondence in response to a notification from a virtual server on which the connected first virtual machine operates.

14. The method according to claim 12,
detecting that the first virtual machine has been connected to the first tunnel endpoint by setting control information for notifying the control apparatus of the connection of the first virtual machine based on a packet from the first virtual machine in a switch that configures the first tunnel endpoint.

15. The method according to claim 12,
detecting that the first virtual machine has been connected to the first tunnel endpoint by analyzing a packet transmitted from the first virtual machine; and
determining the connection of the first virtual machine.

16. The method according to claim 12,
detecting the connection between the first virtual machine and the first tunnel endpoint;
updating a correspondence between the first tunnel endpoint and virtual network to indicate that the first tunnel endpoint belongs to the virtual network.

17. The method according to claim 12, further comprising a step of:
detecting the change of connection between one of a plurality of virtual machine and one of a plurality of tunnel endpoint; and
updating the correspondence between the virtual network and the one of the plurality of tunnel endpoint, in response to the change of the connection.

* * * * *